US008060224B2

(12) United States Patent
Itami et al.

(10) Patent No.: US 8,060,224 B2
(45) Date of Patent: Nov. 15, 2011

(54) MUSIC GENRE JUDGING DEVICE AND GAME MACHINE HAVING THE SAME

(75) Inventors: Tetsuro Itami, Tokyo (JP); Yukie Yamazaki, Tokyo (JP); Matsumi Suzuki, Tokyo (JP); Yasushi Yoshida, Tokyo (JP); Hajime Suzuki, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 539 days.

(21) Appl. No.: 12/305,876

(22) PCT Filed: Jun. 26, 2007

(86) PCT No.: PCT/JP2007/062793

§ 371 (c)(1), (2), (4) Date: Dec. 19, 2008

(87) PCT Pub. No.: WO2008/001765

PCT Pub. Date: Jan. 3, 2008

(65) Prior Publication Data

US 2010/0234108 A1 Sep. 16, 2010

(30) Foreign Application Priority Data

Jun. 30, 2006 (JP) ................................ 2006 182148

(51) Int. Cl.
*G06F 19/00* (2011.01)
*G06F 7/00* (2006.01)
*A63F 13/00* (2006.01)

(52) U.S. Cl. ................. 700/90; 700/94; 381/58; 463/35

(58) Field of Classification Search .................... 700/90, 700/94; 381/58; 463/35
See application file for complete search history.

(56) References Cited

FOREIGN PATENT DOCUMENTS

| | | |
|---|---|---|
| JP | 11-73726 | 7/1989 |
| JP | 03-284800 | 12/1991 |
| JP | 9-146967 | 6/1997 |
| JP | 2001-029649 | 2/2001 |
| JP | 2003-302988 | 10/2003 |
| JP | 2004-163767 | 6/2004 |
| JP | 2006-163264 | 6/2006 |
| KR | 20-0400895 | 11/2005 |

(Continued)

*Primary Examiner* — Evan Pert
(74) *Attorney, Agent, or Firm* — Edwards Angell Palmer & Dodge LLP; Peter C. Schechter; Brian R. Landry

(57) ABSTRACT

A music genre judging device able to judge a genre of music in a relatively simple structure.
The music genre judging device is provided with a signal input part 4 which takes in music reproduction signal outputted from a music reproduction device 100; a signal processing part 10 which outputs an integration value and a differential value of a low frequency component and a differential value of a high frequency component of the music reproduction signal taken in by the signal input part 4; a data generating part 30 which takes in the integration value and the differential values outputted from the signal processing part 10 for each prescribed sampling unit time Tn, judges whether the integration value and the differential value of the low frequency component and the differential value of the high frequency component exceed respective prescribed levels within the sampling unit time Tn, and generates analysis data D1 obtained by totalizing numbers of times of judgment when a value exceeding the prescribed level is detected for each prescribed sampling cycle Tm and each of the integration value and the differential values; and a data analysis part 31 which calculates respective average values M0 to M2 of the totalized values and respective coefficients of variation CV1, CV2 of the totalized values, which are described with respect to the respective differential values of the low frequency component and the high frequency component in the analysis data D1, and judges a genre of music outputted from the music reproduction device based on the calculation result.

15 Claims, 9 Drawing Sheets

FIG. 6

D1

| | ch0 | ch1 | ch2 |
|---|---|---|---|
| smp1 | sum01 | sum11 | sum21 |
| smp2 | sum02 | sum12 | sum22 |
| smp3 | sum03 | sum13 | sum23 |
| smp4 | sum04 | sum14 | sum24 |
| ⋮ | ⋮ | ⋮ | ⋮ |
| smpN | sum0N | sum1N | sum2N |
| AVERAGE | M0 | M1 | M2 |
| COEFFICIENTS of VARIATION | | CV1 | CV2 |

FIG. 7

D4

| M0 | dM0 |
|---|---|
| 0≦M0≦a | 0 |
| a<M0≦b | 1 |
| b<M0≦c | 2 |
| c<M0≦250 | 3 |

FIG. 8

D3

| | dM0 | dM1 | dM2 | dCV1 | dCV2 |
|---|---|---|---|---|---|
| GENRE A | 0 | 0 | 0 | 0 | 0 |
| GENRE A | 1 | 0 | 0 | 0 | 1 |
| GENRE A | 0 | 0 | 0 | 1 | 0 |
| GENRE B | 0 | 1 | 1 | 1 | 0 |
| GENRE B | 0 | 0 | 1 | 0 | 0 |
| | | | ⋮ | | |
| | | | | | |
| | | | | | |
| GENRE X | A | A | A | A | A |

D2

| | |
|---|---|
| GENRE A | Na |
| GENRE B | Nb |
| GENRE C | Nc |
| ⋮ | |
| ⋮ | |
| ⋮ | |
| GENRE X | Nx |

MUSIC GENRE JUDGING DEVICE AND GAME MACHINE HAVING THE SAME

CROSS-REFERENCE TO PRIOR APPLICATION

This is a U.S. national phase application under 35 U.S.C. §371 of International Patent Application No. PCT/JP2007/062793, filed Jun. 26, 2007, which claims the benefit of Japanese Patent Application No. 2006-182148, filed Jun. 30, 2006. The International Patent Application was published in Japanese on Jan. 3, 2008 as International Publication No. WO 2008/001765 A1 under PCT Article 21(2). The afore-mentioned applications are hereby incorporated by reference in their entirety.

TECHNICAL FIELD

The present invention relates to an apparatus and the like which takes in music reproduction signal of music reproduced by a music reproduction device and judges a genre of the music.

RELATED ART

The music reproduction signal outputted from a line-out terminal of a music reproduction device like a portable audio player is an analog signal generated under an assumption of audio conversion by an audio output device such as headphones. No information for judging a genre of music is added to the music reproduction signal. Conventionally, an advanced frequency analyzing processing such as FFT is used as means for analyzing such a music reproduction signal and judging a genre of music. A music genre judging device available for an ordinary user in combination with a music reproduction device is not provided so far. Additionally, a device is provided in a field of game machine, in which audio signal inputted from a microphone is analyzed and the result of analysis is reflected to a figure of a character (for example, please refer to the patent document 1).

[Patent document 1] JP 2001-A-29649

SUMMARY OF INVENTION

Problems to be Solved by the Invention

Thus, it is an object of the present invention to provide a music genre judging device able to judge a genre of music in a relatively simple structure and a game machine to which the same applied.

Means for Solving Problem

The music genre judging device of the present invention includes a signal input part which takes in music reproduction signal outputted from a music reproduction device; a signal processing part which outputs an integration value and a differential value of a low frequency component and a differential value of a high frequency component of the music reproduction signal taken in by the signal input part; a data generating part which takes in the integration value and the differential values outputted from the signal processing part for each prescribed sampling unit time, judges whether the integration value and the differential value of the low frequency component and the differential value of the high frequency component exceed respective prescribed levels within the sampling unit time, and generates analysis data obtained by totalizing numbers of times of judgment when a value exceeding the respective prescribed level is detected for each prescribed sampling cycle and for each of the integration value and the differential values; and a data analysis part which calculates respective average values of the totalized values, which are described in the analysis data, and respective coefficients of variation of the totalized values, which are described with respect to the differential values of the low frequency component and the high frequency component in the analysis data, and judges a genre of music outputted from the music reproduction device based on the calculation result. Thus, the above problem is solved.

According to the investigation of the inventors of the present invention, the music reproduction signal outputted to the audio output device includes a common or similar feature corresponding to a genre of music, and the feature is correlated with the degree of dispersion of the integration value and the differential value of the low frequency component and that of the differential value of the high frequency component contained in the music reproduction signal. In the music genre judging device of the present invention, the data generating part generates analysis data, which is generated by taking the integration value and the differential values outputted from the signal processing part in the data generating part for each sampling unit time, judging whether the integration value and the differential values exceed respective prescribed levels within the sampling unit time, and totalizing numbers of times of judgment when a value extending the prescribed level for each prescribed sampling cycle and for each of the integration value and the differential values. Then, the data analysis part obtains the respective average values and the respective coefficients of variation of the totalized values described in the analysis data. The obtained average values and coefficients of variation reflect the dispersions of the integration value and the differential value of the low frequency component and that of the differential value of the high frequency component contained in the music reproduction signal for each sampling cycle. Therefore, a genre of music reproduced from the music reproduction signal can be judged by figuring out the feature corresponding to the genre of music from the average values and coefficients of variation thereof. The integration processing and the differentiation processing of the music reproduction signal can be performed with relative ease, and the processing of the integration value and the differential values thereof is also only to judge the magnitude relation between the integration value, the differential values and the prescribed levels for each sampling unit time and to totalize the results of judgments, and can be processed speedily with relative ease. Moreover, the calculation processing of the average values and the coefficients of variation of these integration value and differential values can also be performed with relatively simple calculations by using generally-known relational expressions. Therefore, according to the music genre judging device of the present invention, these processing can be well realized by a consumer good or the like equipped with a small-scale micro processing unit (MPU) with a limited processing performance.

In an aspect of the music genre judging device of the present invention, possible ranges of the average values and the coefficients of variation are segmented into a prescribed number of stages, and each stage is represented by an identification value, and the average values and the coefficients of variation are associated with the identification value in advance in calculation result identification data, and the data analysis part obtains the identification values, which respectively corresponds to the calculated average values and coefficients of variation, with reference to the calculation result identification data, and judges a genre of music based on the obtained identification values. By using the identification value, a genre of music can be judged without complexifying the music genre judging device more than necessary.

In an aspect of the music genre judging device of the present invention, each of judgment values obtained by arranging the identification values, each of which corresponds to the average values and the coefficients of variation, in a prescribed sequence are associated with a genre of music in advance in judgment reference data, and the data analysis part may judge a genre corresponding to the obtained identification value as a genre of music, which should be reproduced from music reproduction signal taken in by the signal input part, with reference to the judgment reference data. According to this aspect, a judgment value is obtained by arranging the identification values, each of which corresponds to the average values and the coefficients of variation obtained by the data analysis part in a prescribed sequence, and the correlation relation between the judgment value and the genre of music is investigated in advance and is described in the judgment reference data. Thus, it can be easily identified which genre the judgment value obtained by analyzing the music reproduction signal taken in from the signal input part represents the feature of.

In an aspect of the music genre judging device of the present invention, it may further include history data, where the genre of music is associated with a number of times when genre is judged by the data analysis part, and the data analysis part may update the history data in accordance with the judgment result of genre. According to this aspect, a user's tendency, for example, what genre of music is frequently reproduced by the music reproduction device can be analyzed by storing the number of times of judgment by the music genre judging device for each genre. Moreover, by using the history data, various processes, manipulations, services, or the like can be provided to a user in accordance with the preference of the user.

The music genre judging device of the present invention can be used in various forms. As one form, the music genre judging device maybe disposed between a line-out terminal of a music reproduction device and an audio output device for audio-converting music reproduction signal outputted from the line-out terminal, and the music genre judging device may include a bypass route which lets the music reproduction signal outputted from the line-out terminal to pass through to the audio output device; and a route which takes the music reproduction signal in the signal processing part. According to this aspect, while letting the music reproduction signal outputted from the line-out terminal of a specific music reproduction device to pass through to an audio output device and thus reproducing music, a genre of the music can be judged.

The present invention may be configured as a game machine having the above-mentioned music genre judging device and a game control part which reflects the judgment result of genre to game content. According to such a game machine, music reproduction signal outputted from the music reproduction device can be taken in, and the genre of the music which should be reproduced from the music reproduction signal can be reflected to game content. Thus, an innovative tool, which fuses music reproduction with a music reproduction device and game together, can be provided.

Effect of Invention

As described above, according to the present invention, the average values of the integration value and the differential value of the low frequency component and the differential value of the high frequency component and the coefficients of variation of the differential values of the low frequency component and the high frequency component of the music reproduction signal are obtained, and the genre of music is judged based on the identification values associated with these average values and coefficients of variation. Thus, a music genre judging device able to judge a genre of music with a relatively simple structure and a game machine which the same applied to can be realized.

BRIEF DESCRIPTION OF DRAWINGS

FIG. 6 is a view showing the content of analysis data.

FIG. 7 is a view showing a part of the content of calculation result identification data.

FIG. 8 is a view showing the content of judgment reference data.

BEST MODE FOR CARRYING OUT THE INVENTION

Figure 1:
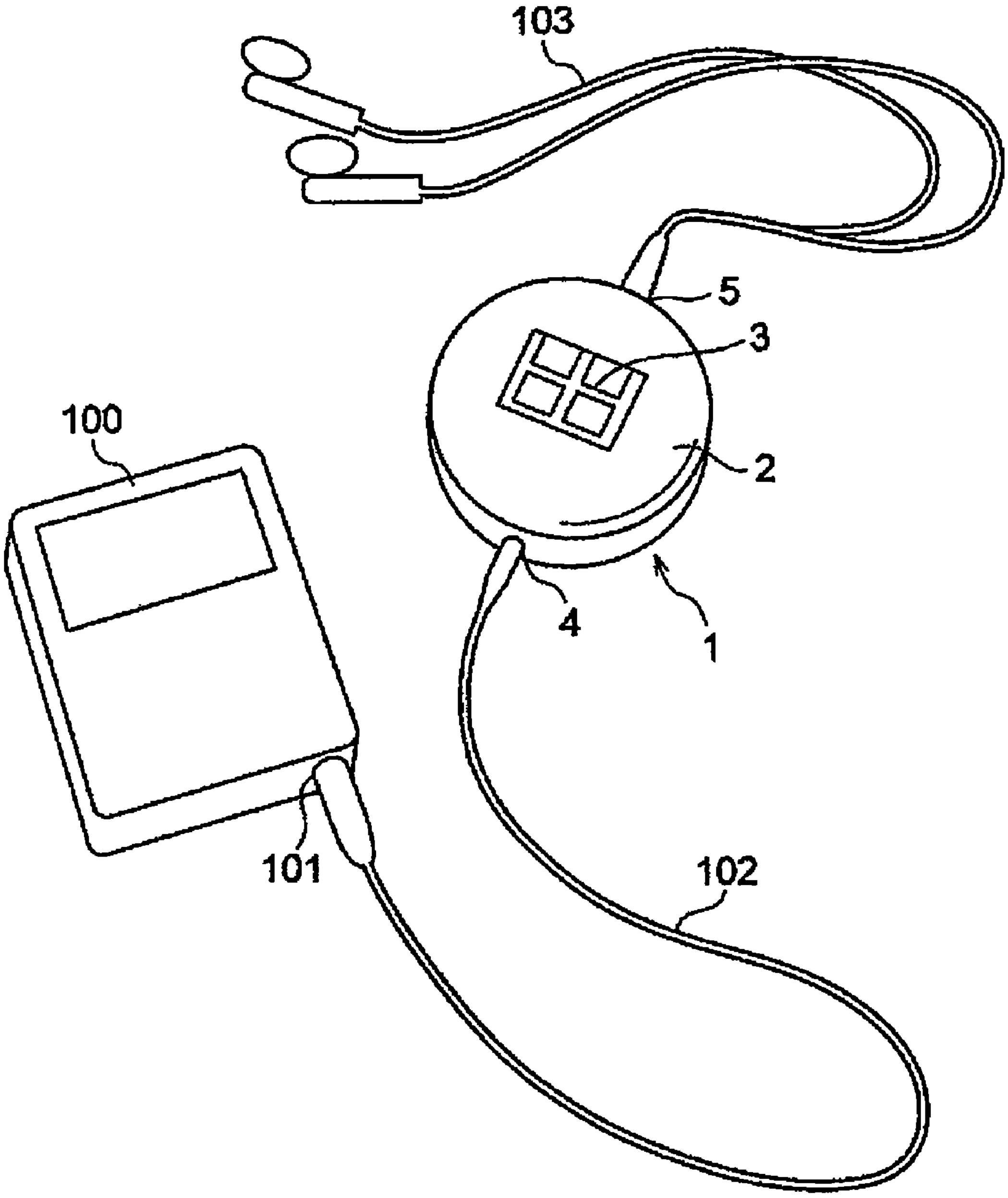
FIG. 1 is a view showing an arrangement of a portable game machine, in which a music genre judging device according to one embodiment of the present invention is built, between a portable music player and earphones.

FIG. 1 shows a portable game machine, which a music genre judging device according to an embodiment of the present invention is built in. The game machine 1 is used in combination with a portable music player 100, and includes a chassis 2 and an LCD3, serving as a display device mounted on the front surface of the chassis 2. The chassis 2 is provided with a line-in terminal 4 and a phone terminal 5. The line-in terminal 4 is connected to a line-out terminal 101 of the portable music player 100 via a connection cable 102. The phone terminal 5 is connected to earphones 103. Namely, the game machine 1 of this embodiment is used in an arrangement between the portable music player 100 and an audio output device to be combined with them. The audio output device combined with the music player 100 is not limited to the earphone 103. Namely, the portable music player 100 has only to be a device able to output a music reproduction signal for audio conversion to various audio output devices such as speakers and headphones, and details of a format of the recording medium, a reproducing method, and the like are not considered. Furthermore, the music player is not limited to a portable type, and includes various appliances for outputting music such as a home audio system, a television, a personal computer, a commercially available portable electric game.

Figure 2:
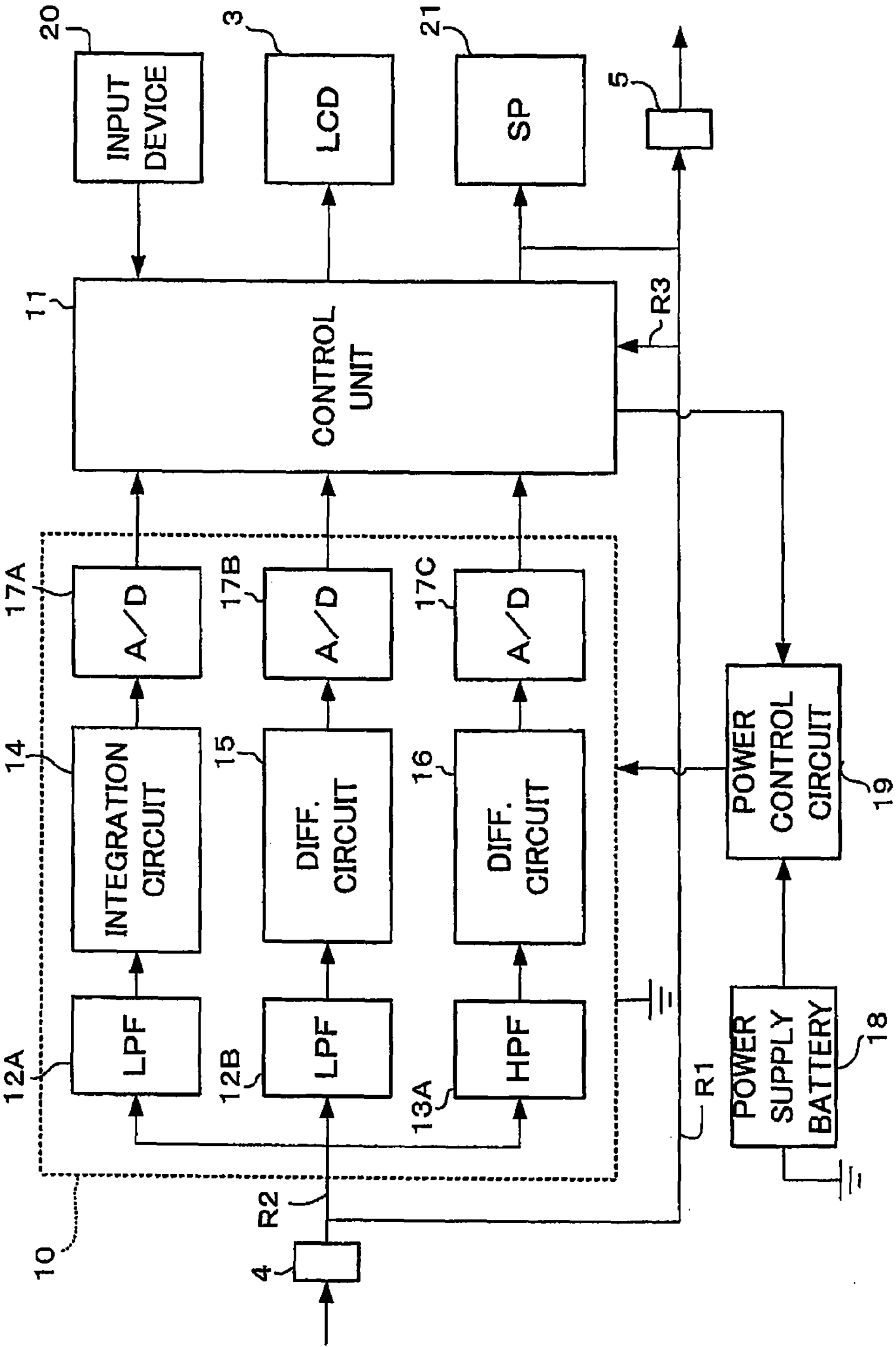
FIG. 2 is a block diagram of a part relating to a music genre judgment in the control system of the game machine of FIG. 1

The game machine 1 functions as a repeater which allows the music reproduction signal outputted from the line-in terminal 4 of the music player 100 to pass therethrough to the earphone 103, and concurrently functions as a game machine which analyses the music reproduction signal outputted from the music player 100 and provides a game to a user in accordance with the results of analysis. FIG. 2 is a block diagram showing a structure of a part especially relating to a function of taking in and analyzing the music reproduction signal in a control system which is provided in the game machine 1. The game machine 1 has a bypass route R1 for allowing an analog audio reproduction signal to pass through from the line-in terminal 4 as a signal input part to the phone terminal 5, a signal processing part 10 for processing the audio reproduction signal taken in from the line-in terminal 4 via a branch route R2, a control unit 11 for taking in the output signal of the signal processing part 10 and the music reproduction signal guided to the branch route R3 from the branch route R1, a power supply battery 18 for supplying electric power to the parts of the game machine 1, and a power control circuit 19 for controlling the power supply from the power supply battery 18 to the signal processing part 10. Although the paths R1, R2 are formed from three lines of a right channel, a left channel, and an earth channel, each of them is represented by a line in the diagram. Moreover, the branch route R3 may be a path of connecting the control unit 11 to at least any one of the right channel and the left channel.

The signal processing part 10 includes a pair of low pass filters (LPF) 12A, 12B for allowing only a low frequency component of the music reproduction signal taken in from the line-in terminal 4 to pass through, a high pass filter (HPF) 13A for allowing only a high frequency component of the music reproduction signal to pass through, an integration circuit 14 for integrating the output signal of LPF12A, a differentiation circuit 15 for differentiating the output signal of LPF12B, a differentiation circuit 16 for differentiating the output signal of HPF13A, and A/D converters 17A to 17C for converting the output signal of the circuits 14 to 16 to digital signals and outputting them to the control unit 11. For example, the frequency range where LPF12A, 12B allow to pass through are set equal to or lower than 1000 Hz. For example, the frequency range where HPF13A allows passing through is set equal to or higher than 1000 Hz. Additionally, the set values of the frequency ranges are not limited to those in the above example. For example, the frequency range where LPF12A, 12B allow to pass through may be set equal to or lower than 500 Hz, the frequency range where HPF13A allows to pass through may be set equal to or higher than 1000 Hz. Furthermore, the frequency ranges where LPF12A, 12B allow to pass through may be set equal to each other, or may differ from each other. When both pass-through frequency ranges are equal to each other, a single LPF may be disposed in place of LPF12A, 12B, and the output signal of the single LPF may be branched to the integration circuit 14 and the differentiation circuit 15.

The control unit 11 is configured as a computer unit where a micro processing unit (MPU) is combined with peripheral devices required to the operation of the MPU, for example storage devices such as a RAM and a ROM. The control unit 11 is connected with the above-mentioned LCD3 as a target of control, and also connected with an input device 20 for providing instructions in a game or the like and a speaker unit (SP) 21 for outputting audio, sound effect, and the like. Furthermore, the phone terminal 5 is also connected in the route connecting to the speaker unit 21.

Figure 3:
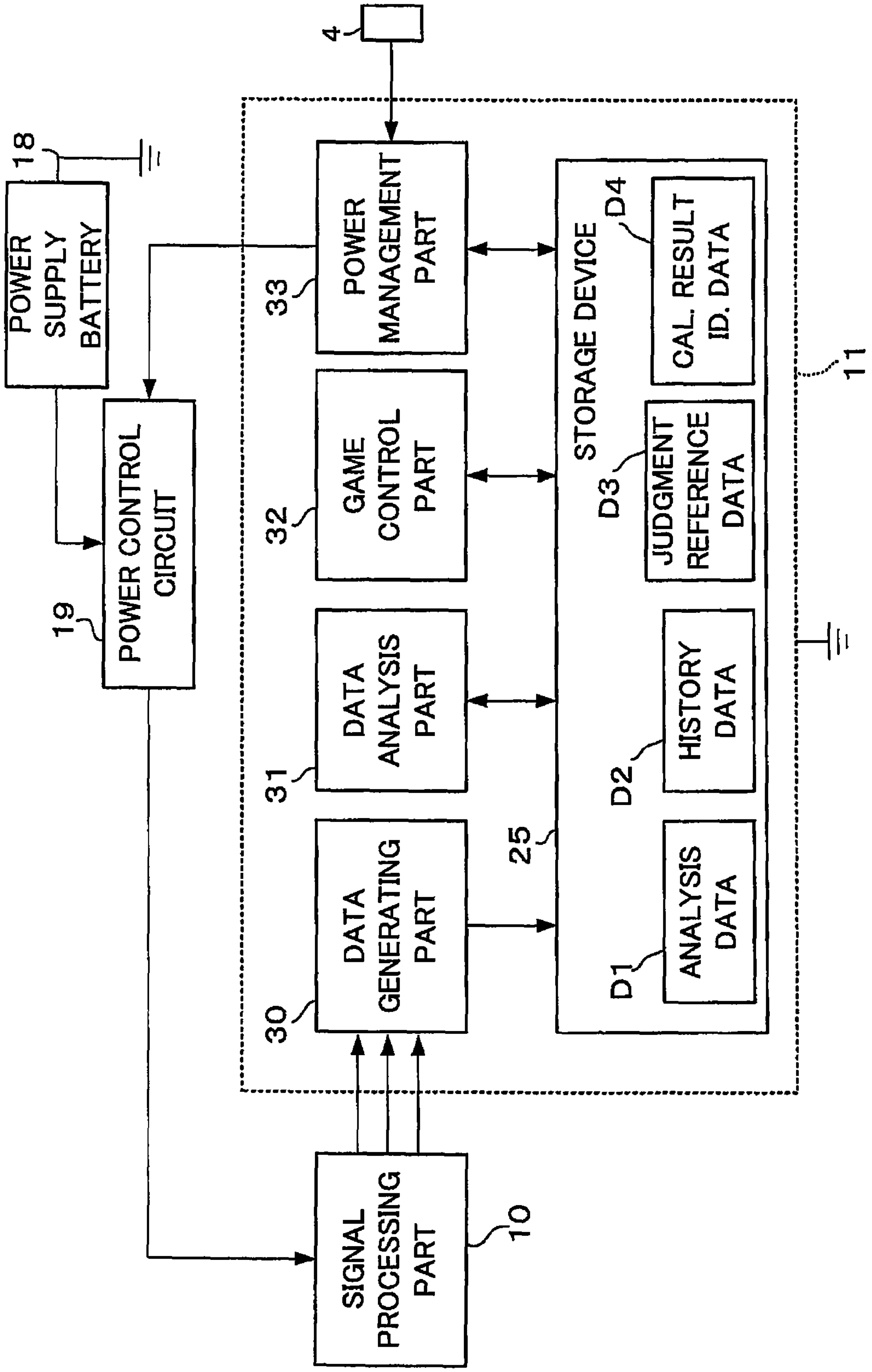
FIG. 3 is a functional block diagram of the control unit of FIG. 2.

The control unit 11 provides various game functions to a user by executing a process of displaying a game image on LCD3 and the like. As a function added to the game, the control unit 11 has a function of analyzing the output signal of the signal processing part 10 and judging a genre of music. FIG. 3 is a functional block diagram of the control unit 11. When the MPU (not shown in the drawing) of the control unit 11 reads out and execute a prescribed control program from the storage device 25, a data generating part 30 and a data analysis part 31, both serving as a feature judging part, a game control part 32, a power management part 33 are generated in the control unit 11 as logical devices. The data generating part 30 processes the output signal of the signal processing part 10, generates analysis data D1, and stores them in the storage device 25. The data analysis part 31 reads out the analysis data D1, judges a genre of music in a prescribed method, and updates history data D2 in accordance with the results of judgment. Judgment reference data D3 stored in the storage device 25 is referred in the genre judgment. The game control part 32 executes a game in accordance with a prescribed game program (not shown) while referring to the history data D2. The power management part 33 judges the existence of the input of the audio reproduction signal from the branch route R3, and controls a switching between the power supplying to the signal processing part 10 from the power supply battery 18 (power-on) and the supply stop (power-off) based on the results of judgment.

Figure 4:
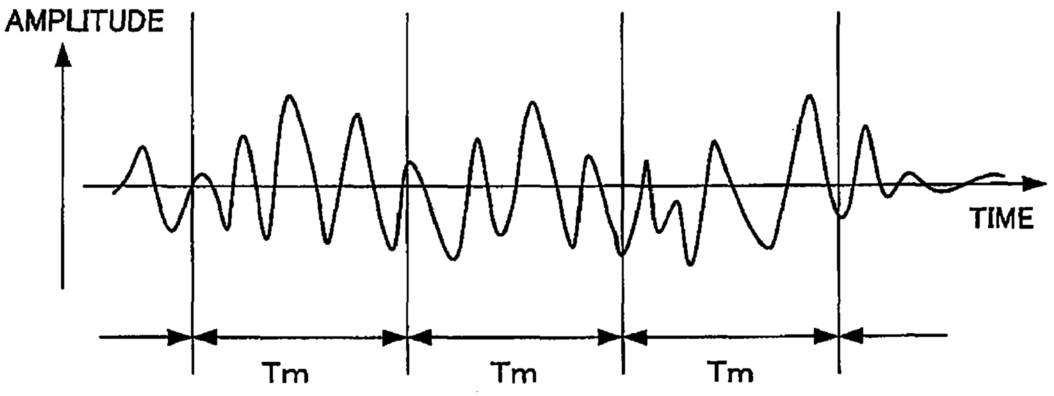
FIG. 4 is a view showing a relation between a music reproduction signal and sampling cycles.

Next, the process relating to the genre judgment by the game machine 1 will be described with reference to FIG. 4 to FIG. 8. FIG. 4 shows an example of waveform of the music reproduction signal inputted in the signal processing part 10 from the line-in terminal 4. In the signal processing part 10, the low frequency component of the music reproduction signal is extracted by LPF12A, 12B, and the high frequency component is extracted by HPF13A. An integration value of the extracted low frequency component is outputted from the integration circuit 14, and a differential value of the low frequency component is outputted by the differentiation circuit 15, and a differential value of the high frequency component is outputted from the differentiation circuit 16. The outputted integration value and differential values are converted to digital signals by the A/D converters 17A to 17C, and the digital signals are inputted in the data generating part 30 of the control unit 11. In the data generating part 30, two types of time lengths are set, one is a sampling cycle Tm shown in FIG. 4 as a reference time for processing the integration value and the differential values outputted from the signal processing part 10, and another is a sampling unit time Tn shown in FIG. 5 (which is a view showing an example of the output waveform of the integration circuit 14). The sampling cycle Tm is an integral multiple of the sampling unit time Tn. As an example, the sampling cycle Tm is set to 5 seconds, and the sampling unit time Tn is set to 20 milliseconds, respectively.

Figure 5:
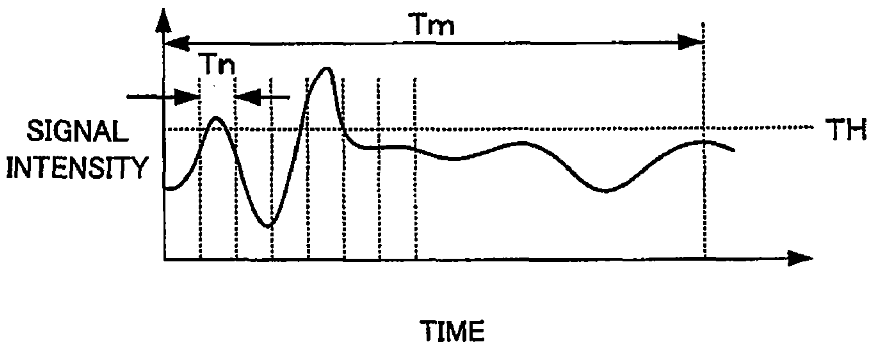
FIG. 5 is a view showing an example of a relation between a waveform of the integration value and a sampling unit time in a sampling cycle.

The data generating part 30 of the control unit 11 takes in the integration value and the differential values for each sampling unit time Tn, and judges whether the integration value and the differential values exceed their prescribed level within the sampling unit time Tn. Then, the data generating part 30 totalizes the number of times of judgment when the value exceeding the prescribed level is detected for each sampling cycle Tm and individually for the integration value and the differential values, and generates analysis data D1. For example, when the integration value of the low frequency component is varied as shown in FIG. 5 in a sampling cycle Tm set in FIG. 4, data generating part 30 monitors whether the integration value exceeds a threshold value TH within each sampling unit time Tn, and judges that the integration value exceeds the prescribed level when the integration value exceeds the threshold value TH. However, when the integration value exceeds the threshold value TH at least one time within a sampling unit time Tn, the number of times is counted as 1 regardless of the number of times when the integration value exceeds the threshold value TH within a sampling unit time Tn. The judgment process is repeated for each sampling unit time Tn in the sampling cycle Tm, and counts the number of times of judgment when the value exceeds the prescribed level at the time when the sampling cycle Tm is lapsed. When the sampling cycle Tm is 5 seconds and the sampling unit time Tn is 20 milliseconds, the minimum number of times is 0 and the maximum number of times is 250 in a cycle Tm.

The data generating part 30 of the control unit 11 executes the above process individually for the integration value and the differential values, sequentially totalizes the measured number of times for each sampling cycle Tm, and generates analysis data D1 as shown in FIG. 6. In the analysis data D1 of FIG. 6, the channel ch0 corresponds to the output from the integration circuit 14, the channel ch1 corresponds to the output from the differentiation circuit 15, the channel ch2 corresponds to the output from the differentiation circuit 16. The sampling numbers smp1 to smpN correspond to the number of cycles from the start time point of the music reproduction signal. Here, it is assumed that the music reproduction signal as a whole correspond to N cycles. Then, the totalized value sum0X of the channel ch0 at the sample number smpX (X is 1 to N) denotes the number of times of judgment when the integration value of the low frequency component exceeds a prescribed level TH in the X-th sampling cycle TmX from the start time point of the processing. For example, sum01 corresponds to the number of times of judgment when the integration value of the low frequency component exceeds the threshold value TH in the first sampling cycle. The same applies to the other channels ch1, ch2.

The data analysis part 31 of the control unit 11 calculates average values M0 to M2 of the totalized values described in the analysis data D1 for each channel, namely, coefficients of variation CV1, CV2 of the totalized values described in the analysis data D1 for the integration value and the differential value of the low frequency component and the differential value of the high frequency component (cf. FIG. 6). Here, the coefficient of variation is a value expressed in percentage and obtained by dividing the standard variation of the totalized values by their average value, and is a type of a value used as a measure for evaluating the magnitude of the dispersion of data in a statistical processing. For example, when SD denotes the standard variation of the totalized value and M denotes the average value, the coefficient of variation is given by $CV=(SD/M)\times 100$. Furthermore, the data analysis part 31 obtains the identification values dM0, dM1, dM2, dCV1, dCV2 each corresponding to the average values M0, M1, M2, the coefficients of variation CV1, CV2 with reference to calculation result identification data D4. The calculation result identification data D4 is a group of tables where the average values M0, M1, M2 and the coefficients of variation CV1, CV2 are respectively associated with the identification values dM0, dM1, dM2, dCV1, dCV2. Possible ranges of the average values or the coefficients of variation are segmented into a prescribed number of stages, and an identification value represents each of the segments. For example as shown in FIG. 7, in the table of the average value M0, the possible value range of the average value M0 is 0 to 250, and is segmented into four stages by three threshold values a, b, c ($a<b<c$). The respective segments are represented as the identification values of 0 to 3. Then, the data analysis part 31 obtains any one of the value of 0 to 3 corresponding to the average value M0 as the identification value dM0 with reference to the table of FIG. 7. For the average values M1, M2 and the coefficients of variation CV1, CV2, similar tables (not shown) are prepared. The data analysis part 31 obtains the identification values dM1, dM2, dCV1, dCV2 corresponding to the average values M1, M2 and the coefficients of variation CV1, CV2 in a similar procedure. Additionally, the identification values dM1, dM2 each corresponding to the average values M1, M2 are segmented into three stages of 0 to 2, and the identification values dCV1, dCV2 corresponding to the coefficients of variation CV1, CV2 are segmented into two stages of 0 or 1. However, the segmentation of each of the identification values may be appropriately changed.

The data analysis part 31 obtains a five-digit numerical value characterizing the waveform of the music reproduction signal as a judgment value by arranging the obtained identification values dM0 to dCV2 in the order of the identification values dM0, dM1, dM2, dCV1, dCV2. For example, when the identification value dM0 is 1, dM1 is 0, dM2 is 0, dCV1 is 0, and dCV is 1, the value 10001 is obtained as the judgment value. 144 ways of judgment values will be obtained in this example. Additionally, the ordered sequence of the identification values dM0 to dM2 and dCV1 , dCV2 for obtaining the judgment value is not limited to that of this embodiment, and may be arbitrarily designated.

Figures 9, 10:
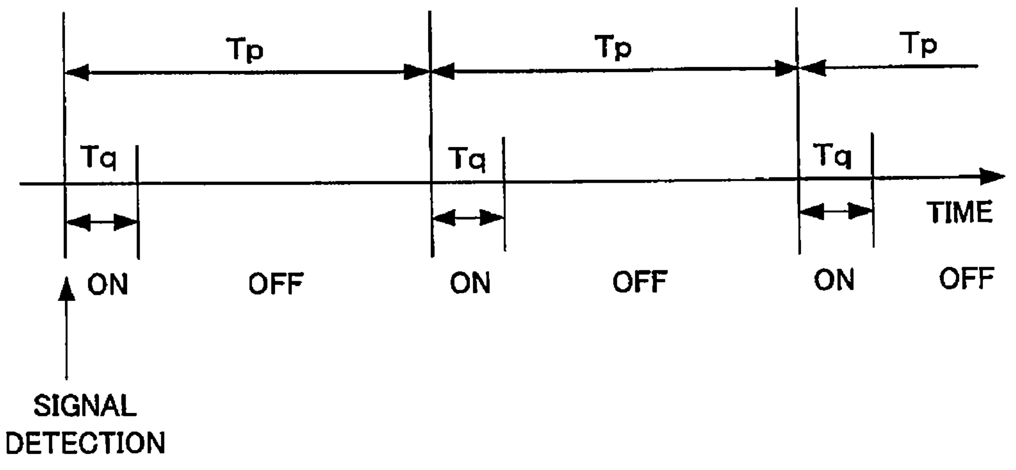
FIG. 9 is a view showing the content of history data.
FIG. 10 is a view showing an example of timings of power on and shut off of the power supply for the signal processing part.

Furthermore, the data analysis part 31 judges the genre of music which should be reproduced from the music reproduction signal based on the above-mentioned five-digit judgment value. In this genre judgment, the judgment reference data D3 is referred. As illustrated in FIG. 8, the genre of the music's A to X and the above-mentioned 144 ways of judgment values are described in the judgment reference data D3 in an associated manner with each other. Here, the genre is a concept used to distinguish music content, for example, classic, rock, ballade, or jazz. The data analysis part 31 compares the obtained judgment value with the judgment reference data D3, and determines the genre matching with the obtained judgment value as the genre corresponding to the music reproduction signal. For example, when the judgment value is 10001, the genre A is determined as the genre corresponding to the music reproduction signal as illustrated in FIG. 8. Furthermore, after the genre is determined, the data analysis part 31 updates the history data D2 in accordance with the results of judgments. For example, the genres A to X and the respective number of times of input Na to Nx are described in the history data D2 in an associated manner with each other as shown in FIG. 9, and the data analysis part 31 updates the history data D2 by adding the number of times of the judged genre by 1. Moreover, a specific number is preset for the number of times of describing the history data D2, and the judged genre may be described in the history data D2 every time when the result of judgments is outputted. In this case, when the number of times of describing exceeds the specific number, the description in the oldest period is deleted, and the history data D2 may be updated such that the up-to-date result of judgments is described.

FIG. 10 is a view showing an example of power management of the signal processing part 10 by the power management part 33. In the power management part 33, two types of time lengths are set as reference times for the on and off timings of the power supply, one is a power supply cycle Tp as a cycle of supplying power, and another is a power-on time Tq. The start point of the power supply cycle Tp and the power-on time Tq are same. As an example, the power supply cycle Tp is set to 30 seconds, and the power-on time Tq is set to 5 seconds. In this embodiment, the power-on time Tq is set to the same time length as the above-mentioned sampling cycle Tm. Additionally, the power-on time Tq is not limited to the same time length as the sampling cycle Tm, may be longer than the sampling cycle Tm. In this way, the power management part 33 manages the on and off timings of the power supply for the signal processing part 10, and instructs the power control circuit 19 to turn the power supply on and off. The power control circuit 19 switches on and off the supply of power from the power supply battery 18 to the signal processing part 10 in accordance with the instruction from the power management part 33.

Figure 11:
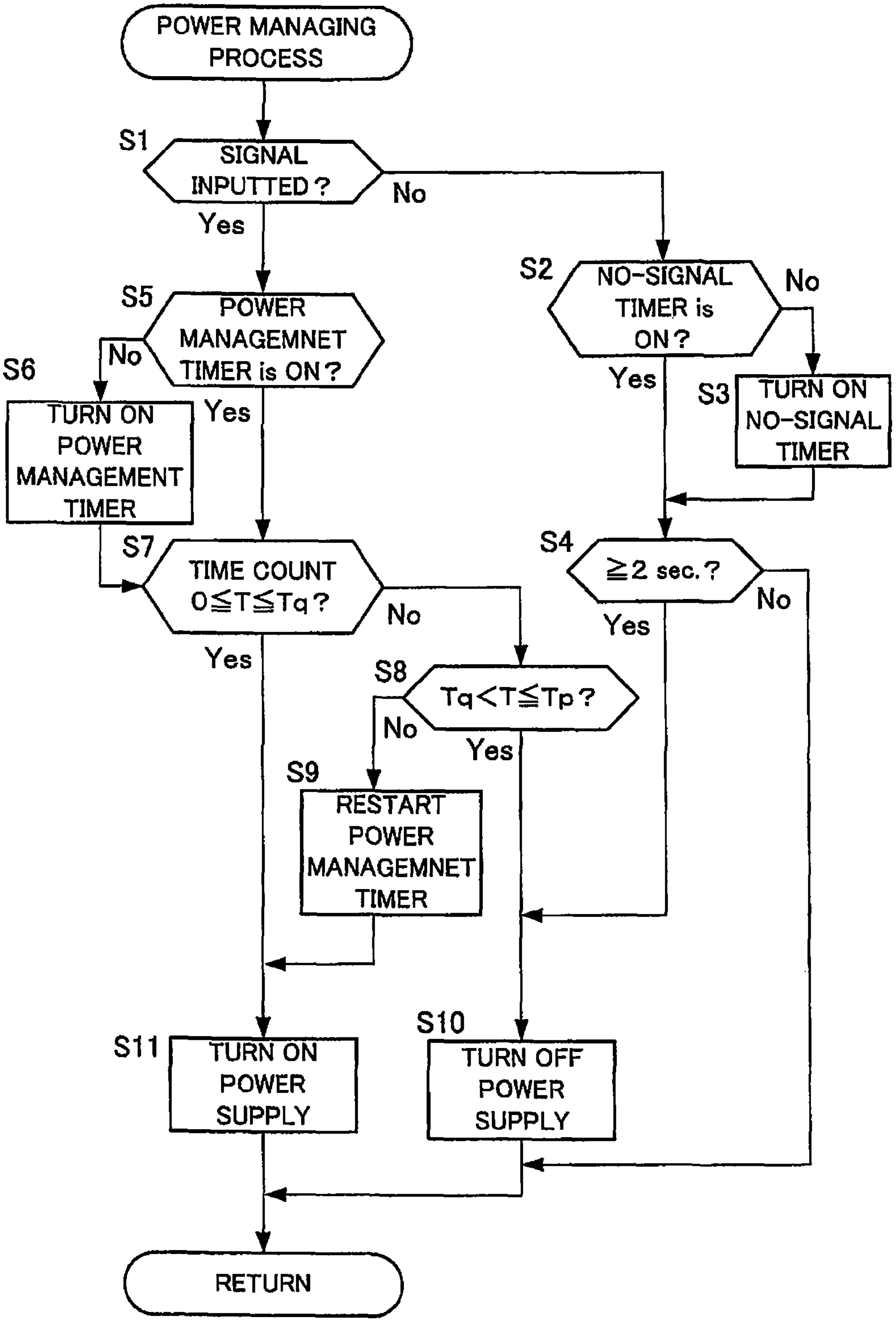
FIG. 11 is a flowchart showing a power managing process routine executed by the control unit.

FIG. 11 shows a power managing process routine executed by the control unit 11 (power management part 33) for managing on and off of the power supply. In the power managing process routine, the control unit 11 judges at the first S1 whether the music reproduction signal is inputted from the line-in terminal 4. When it is not inputted, the control unit 11 determines at the step S2 whether a no-signal timer is on, namely, it is in measuring time, the no-signal timer measuring the time period during which the music reproduction signal is not inputted. When it is not on, the control unit 11 starts the no-signal timer at the step S3, starts measuring the duration time of no signal, and thereafter advances to the next step S4. When the no-signal timer is on at the step S2, the control unit 11 skips the step S3 and advances to the step S4. At the step S4, the control unit 11 determines whether the time measured by the no-signal timer is equal to or longer than 2 seconds. When it is less than 2 seconds, the control unit 11 ends the power managing process routine. When it is equal to or longer than 2 seconds, the control unit 11 advances to the step S10, and instructs the power control circuit 19 to turn off the power supply for the signal processing part 10, and ends the power managing process routine.

When it is determined at the step S1 that music reproduction signal is inputted, the control unit 11 advances to the step S5, and determines whether a power management timer for measuring a power supply cycle Tp is turned on, namely, it is in measuring time. When it is not on, the control unit 11 turns on the power management timer at the step S6, and advances to the step S7. When the power management timer is on at the step S5, the control unit 11 skips the step S6 and advances to the step S7. At the step S7, the control unit 11 determines whether the measured time T of the power management timer is in a range from the measurement start time point, namely that is equal to or longer than 0 and that is equal t or shorter than the power-on time Tq. When it is not in the range, the control unit 11 advances to the step S8, and determines whether the measured time T is in a range that is longer than the power-on time Tq and that is equal to or shorter than the power supply cycle Tp. When the measured time T is not in the range of the step S8, the control unit 11 advances to the step S9, resets the power management timer to the initial value of 0, and resumes the time measurement operation. Then, the control unit 11 advances to the step S11, instructs the power control circuit 19 to turn on the power supply for the signal processing part 10, and thereafter ends the power managing process routine. When the measured time T is in the range of the step S8, the control unit 11 advances to the step S10, and instructs the power control circuit 19 to turn off the power supply for the signal processing part 10, and thereafter ends the power managing process routine. When the measured time T is in the range of the step S7, the control unit 11 advances to the step S11 and instructs the power control circuit 19 to turn on the power supply for the signal processing part 10, and thereafter ends the power managing process routine.

In the above processes, when the input of an audio reproduction signal is detected, it is affirmed at the step S1, and the power management timer is turned on at the step S6. In the following, as long as the audio reproduction signal is not discontinued continuingly over 2 seconds, the time measurement by the power management timer is repeated for each power supply cycle Tp. Then, it is affirmed at the step S7 only the time period from the measurement start time point to the power-on time Tq, and the power supply for the signal processing part 10 is turned on at the step S11. In this way, on and off of the power supply for the signal processing part 10 are controlled as shown in FIG. 10.

Figure 12:
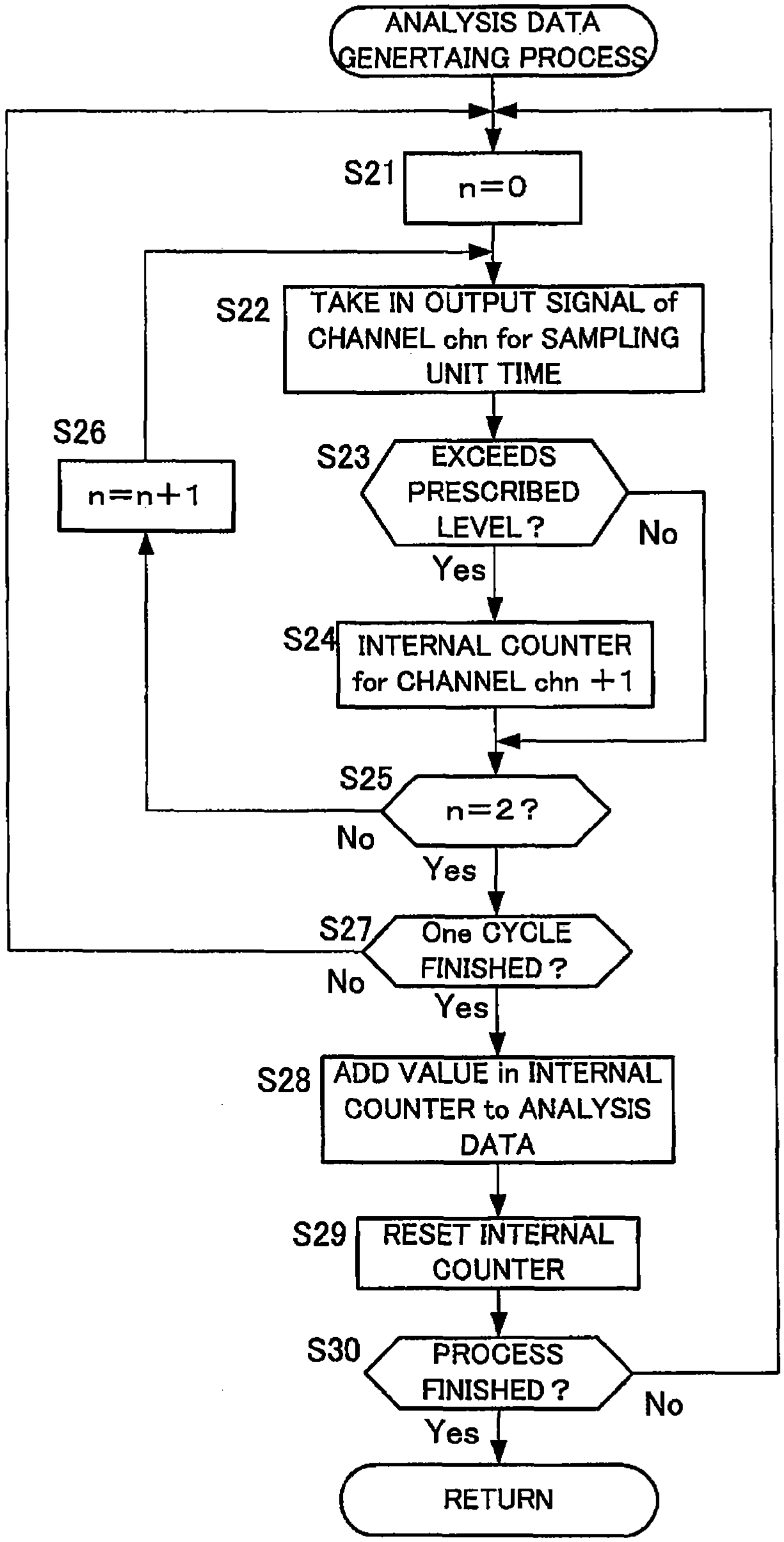
FIG. 12 is a flowchart showing an analysis data generating process routine executed by the control unit.

Next, the procedure of the process executed by the control unit 11 for executing the above-mentioned genre judgment will be described with reference to FIG. 12 and FIG. 13. FIG. 12 shows an analysis data generating process routine executed by the control unit 11 (data generating part 30) for generating the analysis data D1. This routine is executed under the condition that the integration value and the differential values are respectively outputted from the signal processing part 10, for example, in a situation that a user instructs the genre judgment from the input device 20 (cf. FIG. 2). Additionally, the integration value and the differential values outputted from the signal processing part 10 are stored sequentially in the internal buffer of the control unit 11, and processed in this routine.

In the analysis data generating process routine, the control unit 11 sets the variable n to the initial value of 0 at the first step S21, the variable n assigning the number for the channel ch which is a target of the data processing. At the subsequent step S22, the control unit 11 takes in the output signal (the integration value or the differential value) of the channel chn for the sampling unit time from the internal buffer. At the next step S23, the control unit 11 judges whether the taken-in output signal exceeds the prescribed level. When it exceeds the prescribed level, the control unit 11 advances to the step S24, adds the internal counter for the channel chn by 1, and thereafter advances to the step S25. On the other hand, when it does not exceed the prescribed level at the step S23, the control unit 11 skips the step S24 and advances to the step S25.

At the step S25, the control unit 11 determines whether 2 is set to the variable n. When it is not 2, the control unit 11 adds the variable n by 1 at the step S26, and returns the step S2. On the other hand, when the variable n is 2 at the step S25, the control unit 11 advances to the step S27. By repeating the processes of steps S22 to S26, three channels ch0 to ch2, namely, the respective outputs of the integration circuit 14 and the differentiation circuit 15 for the low frequency component, and the differentiation circuit 16 for the high frequency component are checked up for the length of the sampling unit time.

At the step S27, the control unit 11 judges whether the process for one sampling cycle Tm is finished. For example, when the number of times of affirmative determination at the step S25 is equal to the value obtained by dividing the sampling cycle Tm by the sampling unit time Tn, it can be determined that the process for the sampling cycle Tm is finished. When it is disaffirmatively determined at the step S27, the control unit 11 returns to the step S21, and advances to the processing of the signal stored in the internal buffer for the next sampling unit time. On the other hand, when it is affirmatively judged at the step S27, the control unit 11 advances to the step S28, and makes the values stored in the internal counter to the analysis data D1 stored in the storage device 25 as the totalized values sum0X, sum1X, sum2X (cf. FIG. 6) of the sample number smpX corresponding to the current sampling cycle. When the analysis data D1 does not yet exist, the analysis data D1 is newly generated, and the totalized value is stored therein in an associated manner with the first sample number smp1.

At the subsequent step S29, the control unit 11 resets the value of the internal counter to the initial value of 0, and further determines at the next step S30 whether the generating process of the analysis data D1 is finished. For example, when so-called no sound condition, in which the outputs of all the channels ch0 to ch2 are close to 0, continues for over prescribed seconds, it can be determined that the process is finished. Then, when the process is not finished, the control unit 11 returns to the step S21. When it is determined that the process is finished, the control unit 11 ends the analysis data generating process routine. In the above process, the analysis data D1 as shown in FIG. 6 is generated.

Figure 13:
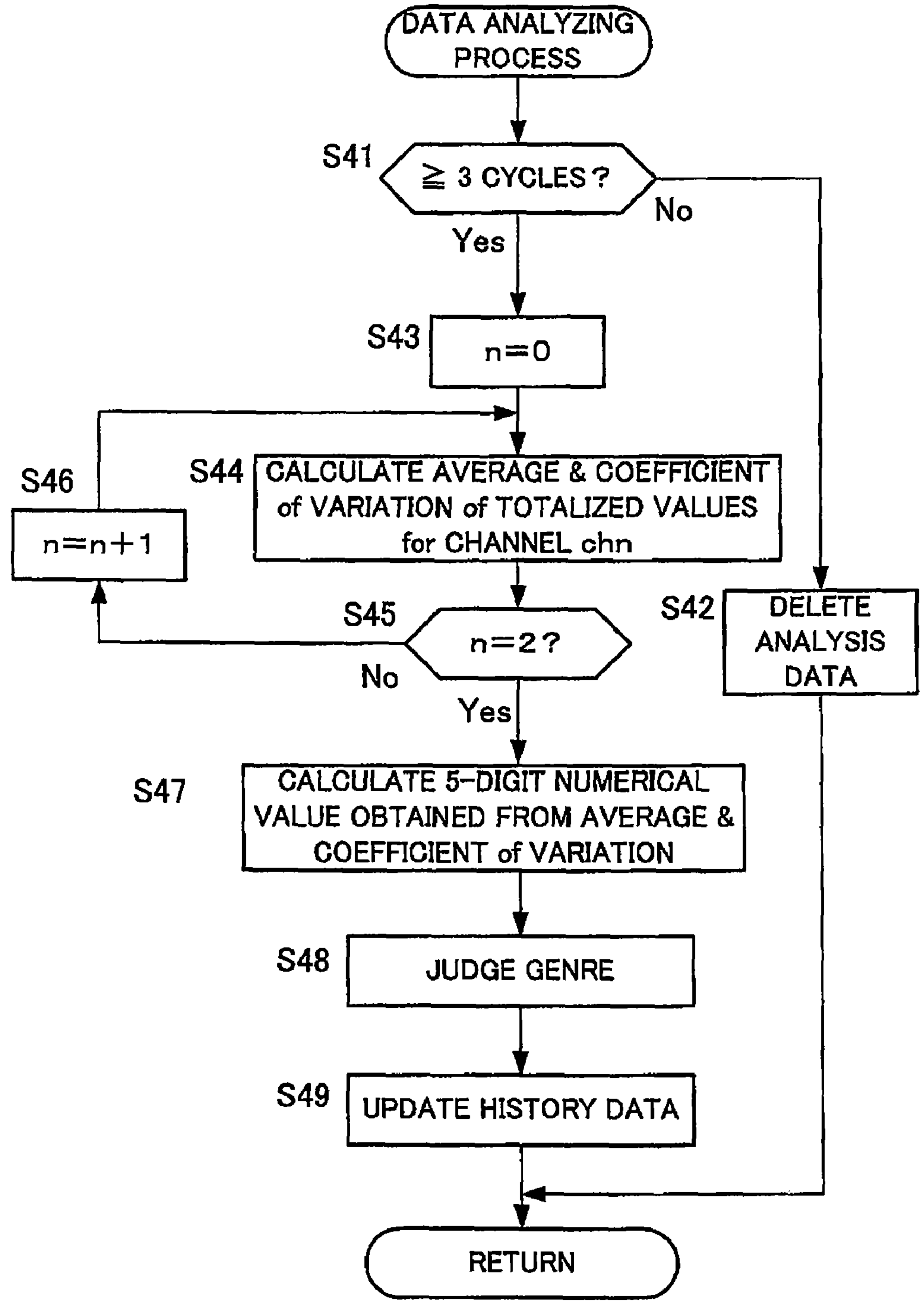
FIG. 13 is a flowchart showing a data analyzing process routine executed by the control unit.

FIG. 13 shows a data analyzing process routine executed by the control unit 11 (data analysis part 31) for judging a genre of music from the analysis data D1. The routine is executed successively after the analysis data generating process routine of FIG. 12 is finished. In the data analyzing process routine, the control unit 11 judges at the first step S41 whether the analysis data D1 for three or more cycles of the sampling cycle Tm is generated. When no such analysis data D1 is generated, the control unit 11 deletes the analysis data D1 at the step S42, and ends the data analyzing process. When the analysis data D1 for three or more cycles is generated, the control unit 11 advances to the step S43. At the step S43, the variable n is set to the initial value of 0, the variable n assigning the number for the channel ch which is a target of the data processing. At the subsequent step S44, reads out the totalized values of the channel number chn corresponding to the variable n from the analysis data D1 stored in the storage device 25, and calculates the average values of them and the coefficients of variation for the totalized value of the differential values of the low frequency component and the high frequency component. At the next step S45, the control unit 11 determines whether the variable n is set to 2. When it is not 2, the control unit 11 adds the variable n by 1 at the step S46 and returns to the step S44. On the other hand, when the variable n is 2 at the step S45, the control unit 11 advances to the step S47. By repeating the processes of the steps S44 to S46, the respective average values M0 to M2 for the three channels ch0 to ch2 and the coefficients of variation CV1, CV2 for the differential values of the low frequency component and the high frequency component are calculated.

At the step S47, the control unit 11 obtains the identification values dM0, dM1, dM2, dCV1, dCV2, each of which corresponds to the obtained average values M0 to M2 and the coefficients of variation CV1, CV2, with reference to the calculation result identification data D4. At the next step S48, the control unit 11 judges the genre of music by selecting the genre corresponding to the five-digit judgment value, where the identification values dM0, dM1, dM2, dCV1, dCV2 are ordered in this sequence, with reference to the judgment reference data D3 stored in the storage device 25. Furthermore, the control unit 11 updates the history data D2 at the next step S49 in such a manner the number of times for the judged genre is added by 1, and thereafter ends the data analyzing process routine.

In the game machine 1 of this embodiment, since the number of times of judgment for each genre is stored in the history data D2, the repetition, a user's genre preference, or the like for each of the genre of the music listened by the user via the game machine 1 can be analyzed with reference to the history data D2, and the results of judgment of the genre can be reflected to the content of game executed by the game control part 32. For example, when the game control part 32 executes a game for bringing up a character, the character's attribute such as a mode or a personality can be changed by the operation of the game control part 32 in accordance with the distribution of number of times of judgment for each genre described in the history data D2.

The present invention is not limited to the above embodiment, and can be embodied in various forms. For example, in the above embodiment, the number of times when the integration value and the differential value of the low frequency component and the differential value of the high frequency component exceed the prescribed levels within the sampling unit time are totalized respectively. The degree of dispersion of the waveform of the music reproduction signal is judged by calculating the average values and the coefficients of variation for the totalized values. However, the present invention is not limited to the one using only the average values and the coefficients of variation. For example, a genre of music can be judged with further reference to various statistical values such as a standard deviation, a variance, or a summation of the totalized values. Any multiple types of statistical values may be used. Moreover, only the coefficients of variation for the differential values of the low frequency component and the high frequency component are computed. However, the present invention is not limited to those computations, and the coefficients of variation for each of the totalized value of all the differential values and the integration value may be computed and used for the genre judgment. The five-digit judgment value characterizing the waveform of the music reproduction signal is used for the data analysis. However, the number of digits may be set in accordance with various statistical values to be calculated. For example, when the average values and the coefficients of variation for each of the integration value and the differential value of the low frequency component and the differential value of the high frequency component is calculated, the judgment value characterizing the waveform of the music reproduction signal becomes a six-digit long.

The signal processing part may be configured as a hardware device where circuit elements such as IC, LSI are combined with each other, or may be configured as a logical device where MPU is combined with software. The data generating part and the data analysis part may be respectively configured as a hardware device. The signal input part is not limited to the line-in terminal. For example, a device of receiving the reproduction signal, which is transmitted from the music reproduction device by using a radio transmission such as FM radio wave, and of converting to the music reproduction signal may be used as the signal input part.

In the above embodiment, a music genre judging device is configured by combining the line-in terminal 4, the signal processing part 10, and the control unit 11. However, the music genre judging device of the present invention is not limited to a device mounted on to the game machine. The music genre judging device of the present invention can be applied to various devices for judging a genre of music from the music reproduction signal outputted to the audio output device such as earphones, headphones, or speakers from the music reproduction device.

The invention claimed is:

1. A music genre judging device, comprising:

a signal input part which takes in music reproduction signal outputted from a music reproduction device;

a signal processing part which outputs an integration value and a differential value of a low frequency component and a differential value of a high frequency component of the music reproduction signal taken in by the signal input part;

a data generating part which takes in the integration value and the differential values outputted from the signal processing part for each prescribed sampling unit time, judges whether the integration value and the differential value of the low frequency component and the differential value of the high frequency component exceed respective prescribed levels within the sampling unit time, and generates analysis data obtained by totalizing numbers of times of judgment when a value exceeding the respective prescribed level is detected for each prescribed sampling cycle and each of the integration value and the differential values; and a data analysis part which calculates respective average values of the totalized values, which are described in the analysis data, and respective coefficients of variation of the totalized values, which are described with respect to the differential values of the low frequency component and the high frequency component in the analysis data, and judges a genre of music outputted from the music reproduction device based on the calculation result.

2. The music genre judging device according to claim 1, wherein possible ranges of the average values and the coefficients of variation are segmented into a prescribed number of stages, and each stage is represented by an identification value, and the average values and the coefficients of variation are associated with the identification value in advance in calculation result identification data, and the data analysis part obtains the identification values, which respectively corresponds to the calculated average values and coefficients of variation, with reference to the calculation result identification data, and judges a genre of music based on the obtained identification values.

3. The music genre judging device according to claim 2, wherein each of judgment values obtained by arranging the identification values, each of which corresponds to the average values and the coefficients of variation, in a prescribed sequence are associated with a genre of music in advance in judgment reference data, and the data analysis part judges a genre corresponding to the obtained identification value as a genre of music, which should be reproduced from music reproduction signal taken in by the signal input part, with reference to the judgment reference data.

4. The music genre judging device according to claim 1, further comprising history data, where the genre of music is associated with a number of times when genre is judged by the data analysis part, and the data analysis part updates the history data in accordance with the judgment result of genre.

5. The music genre judging device according to claim 1, wherein the music genre judging device is disposed between a line-out terminal of the music reproduction device and an audio output device for audio-converting music reproduction signal which is outputted from the line-out terminal, and the music genre judging device comprises a bypass route which lets the music reproduction signal outputted from the line-out terminal to pass through to the audio output device; and a route which takes the music reproduction signal in the signal processing part.

6. A game machine, comprising: the music genre judging device according to claim 1; and a game control part which reflects the judgment result of genre to game content.

7. The music genre judging device according to claim 2, further comprising history data, where the genre of music is associated with a number of times when genre is judged by the data analysis part, and the data analysis part updates the history data in accordance with the judgment result of genre.

8. The music genre judging device according to claim 3, further comprising history data, where the genre of music is associated with a number of times when genre is judged by the data analysis part, and the data analysis part updates the history data in accordance with the judgment result of genre.

9. The music genre judging device according to claim 2, wherein the music genre judging device is disposed between a line-out terminal of the music reproduction device and an audio output device for audio-converting music reproduction signal which is outputted from the line-out terminal, and the music genre judging device comprises a bypass route which lets the music reproduction signal outputted from the line-out terminal to pass through to the audio output device; and a route which takes the music reproduction signal in the signal processing part.

10. The music genre judging device according to claim 3, wherein the music genre judging device is disposed between a line-out terminal of the music reproduction device and an audio output device for audio-converting music reproduction signal which is outputted from the line-out terminal, and the music genre judging device comprises a bypass route which lets the music reproduction signal outputted from the line-out terminal to pass through to the audio output device; and a route which takes the music reproduction signal in the signal processing part.

11. The music genre judging device according to claim 4, wherein the music genre judging device is disposed between a line-out terminal of the music reproduction device and an audio output device for audio-converting music reproduction signal which is outputted from the line-out terminal, and the music genre judging device comprises a bypass route which lets the music reproduction signal outputted from the line-out terminal to pass through to the audio output device; and a route which takes the music reproduction signal in the signal processing part.

12. A game machine, comprising: the music genre judging device according to claim 2; and a game control part which reflects the judgment result of genre to game content.

13. A game machine, comprising: the music genre judging device according to claim 3; and a game control part which reflects the judgment result of genre to game content.

14. A game machine, comprising: the music genre judging device according to claim 4; and a game control part which reflects the judgment result of genre to game content.

15. A game machine, comprising: the music genre judging device according to claim 5; and a game control part which reflects the judgment result of genre to game content.

* * * * *